(12) United States Patent
Tyndall et al.

(10) Patent No.: US 7,127,572 B2
(45) Date of Patent: Oct. 24, 2006

(54) CONSOLIDATION OF UNIT ATTENTIONS

(75) Inventors: John F. Tyndall, Austin, TX (US);
LinLin Gao, Cedar Park, TX (US);
Robert D. Whittington, Pflugerville, TX (US)

(73) Assignee: Crossroads Systems, Inc., Austin, TX (US)

( * ) Notice: Subject to any disclaimer, the term of this patent is extended or adjusted under 35 U.S.C. 154(b) by 310 days.

(21) Appl. No.: 10/782,136

(22) Filed: Feb. 19, 2004

(65) Prior Publication Data
US 2005/0188162 A1 Aug. 25, 2005

(51) Int. Cl.
*G06F 12/00* (2006.01)

(52) U.S. Cl. .......................... 711/156; 710/19

(58) Field of Classification Search ................ 711/156, 711/158, 159; 710/15, 19
See application file for complete search history.

(56) References Cited

U.S. PATENT DOCUMENTS

| | | | | |
|---|---|---|---|---|
| 6,021,431 A * | 2/2000 | Giorgio et al. | ............. | 709/217 |
| 6,374,161 B1 * | 4/2002 | Iwai et al. | ..................... | 701/1 |
| 6,718,402 B1 * | 4/2004 | Arroyo | ........................ | 710/19 |
| 2003/0014533 A1 * | 1/2003 | Greene et al. | .............. | 709/232 |
| 2004/0064293 A1 * | 4/2004 | Hamilton et al. | ........... | 702/182 |
| 2004/0205069 A1 * | 10/2004 | Ishizawa | ...................... | 707/10 |

\* cited by examiner

Primary Examiner—Hiep T. Nguyen
(74) Attorney, Agent, or Firm—Sprinkle IP Law Group

(57) ABSTRACT

Systems and methods for reducing the number of unit attentions provided to a set of initiator devices by eliminating unnecessary unit attentions from queues in which unit attentions for each of the initiator devices are stored. In one embodiment, a system comprises a processor and a memory implemented in a router that is coupled between a target device and multiple initiator devices. As each unit attention is generated by the target device, it is forwarded to the initiator device that prompted the unit attention, and is stored in a queue for each of the other initiator devices. Periodically, the queues are examined to determine whether any of the unit attentions stored therein are unnecessary. One or more of the unit attentions that are determined to be unnecessary may be eliminated from the respective queues, reducing the number of unit attentions that are provided to the respective initiator devices.

23 Claims, 3 Drawing Sheets

CONSOLIDATION OF UNIT ATTENTIONS

BACKGROUND OF THE INVENTION

Computer systems may include a variety of devices. These devices may include not only what is typically thought of as a "computer" (e.g., a PC or other general-purpose computer) but also peripheral devices that enhance the functionality of the computer. Peripheral devices may perform a number of functions, such as printing, communication, user input/output (I/O), data storage, and so on.

In one exemplary system, a general-purpose computer or workstation may be connected to a tape drive. The tape drive provides a means to back up the data of the general-purpose computer so that the data will not be lost in the event of a failure of the general-purpose computer. In this particular system, the tape drive is configured to communicate with the general-purpose computer using a protocol called the small computer system interface (SCSI) protocol.

Typically, the tape drive is connected directly to the computer via a SCSI transport medium. In communications between the computer and the tape drive, the computer acts as an initiator, while the tape drive acts as a target. In other words, the computer initiates communications, typically by sending a command to the tape drive, while the tape drive is the device that is targeted by the command. Because the tape drive may not always be ready to respond to commands initiated by the computer, the tape drive is configured to provide notifications (that are typically referred to as "unit attentions") to the computer to let the computer know that the tape drive cannot perform the command or otherwise provide the response requested by the computer.

Unit attentions may be provided in a number of situations. For example, it may be necessary for the tape drive to provide a unit attention to the computer when the media (tape) has been changed, when the tape drive has been reset or power cycled, and so on. The unit attentions may identify the particular bases for the unit attentions so that the computer can adapt its commands or requests appropriately. For example, if the computer sends a command to the tape drive to access a particular tape, that tape may have been replaced by another tape, so the tape drive may provide a unit attention to the computer identifying the media change. The computer then knows that it must request the desired tape before the tape can be accessed.

If the tape drive had been powered down and then powered up again, a unit attention indicating the power cycling of the tape drive would be provided to the computer. Upon receiving the unit attention, the computer would be aware that it could not assume the validity of any previously used settings for the tape drive. The computer could therefore check these settings before continuing to communicate with the tape drive.

In some systems, a peripheral device such as a tape drive may be used by more than a single computer. In one exemplary system, multiple host computers are coupled to a router, which is in turn coupled to the tape drive. The router directs communications from the host computers to the tape drive and returns responses from the tape drive to the appropriate one of the host computers. Again, these communications are subject to the unit attentions that may be provided by the tape drive.

In the multiple-host scenario, the conventional use of unit attentions may cause several problems. Normally, unit attentions are provided by the tape drive in response to commands from an initiator (e.g., one of the host computers). Because there are multiple host computers, a particular unit attention provided by the tape drive in response to a command from a particular one of the host computers is received by the router and forwarded to this particular computer. The unit attention is not immediately forwarded to the other host computers, but is instead stored in the router and is forwarded to each of the other host computers when a command to the tape drive is received from each of these host computers.

A number of unit attentions may be generated by the tape drive and stored by the router during a period of inactivity by a particular host computer. When this host computer finally sends a command to the tape drive, it will receive the first of the stored unit attentions in response to the command. Upon resending the command, it will receive the next of the stored unit attentions. There may be enough unit attentions stored in the router that the host computer will receive a threshold number of unit attentions and consequently assume the tape drive has malfunctioned.

Even if the host computer does not assume that the tape drive has malfunctioned, it may be forced to waste time and resources re-sending the desired command just to exhaust all of the unit attentions stored for it in the router. This is inefficient because it typically is not necessary for all of these accumulated unit attentions to be presented to the host computer. For example, if, while a first host computer is inactive, there are several media changes resulting from communications with a second host computer, there may be multiple media-change unit attentions stored in the router for the first computer. When the first host computer sends a command to the tape drive, it only needs to receive one of the media-change unit attentions. The remainder of these unit attentions are redundant. Nevertheless, each of these unit attentions is provided to the first host computer in response to a subsequent command.

SUMMARY OF THE INVENTION

One or more of the problems outlined above may be solved by the various embodiments of the invention. Broadly speaking, the invention comprises systems and methods for reducing the number of unit attentions provided to a set of initiator devices by eliminating unnecessary unit attentions from queues in which unit attentions for each of the initiator devices are stored.

In one embodiment, a system that includes a processor and a memory coupled to the processor, where the processor is configured to store unit attentions received from a first target device in the memory, periodically identify unnecessary ones of the unit attentions stored in the memory, and remove the unnecessary unit attentions from the memory. In one embodiment, the system is where the processor is configured to store the unit attentions in a plurality of queues or stacks in the memory, where each queue or stack is associated with a corresponding target device, or with a corresponding initiator device. In one embodiment, the unit attentions are determined to be unnecessary if they are redundant. In another embodiment, each of the unit attentions is associated with a corresponding priority, and the unit attentions are determined to be unnecessary if they have a priority lower than another unit attention in the memory. In one embodiment, the processor and memory are incorporated into the target device itself.

Another embodiment comprises a router coupled between a target device and multiple initiator devices. As each unit attention is generated by the target device, it is forwarded by the router to the initiator device that prompted the unit attention, and is also stored in a queue for each of the other initiator devices. Unit attentions are thereby accumulated for one or more of the initiator devices. Periodically, the queues are examined to determine whether any of the unit attentions stored therein are unnecessary. One or more of the unit attentions that are determined to be unnecessary may be eliminated from the respective queues, thereby reducing the number of unit attentions that are provided to the respective initiator devices.

Another embodiment comprises a method which includes storing unit attentions received from a first target device in a memory, periodically identifying unnecessary ones of the unit attentions stored in the memory, and removing the unnecessary unit attentions from the memory. In one embodiment, the method further comprises storing the unit attentions in a plurality of queues or stacks where each queue or stack is associated with a corresponding target device, or with a corresponding initiator device. In one embodiment, the method further comprises identifying unit attentions that are redundant and determining that these unit attentions are unnecessary. In another embodiment, the method further comprises associating each of the unit attentions with a corresponding priority, identifying a first unit attention having a higher priority, and determining that the unit attentions having lower priorities are unnecessary.

Another embodiment comprises a software product that includes a computer-readable medium containing instructions that are executable by a computer to perform a method including the steps of storing unit attentions received from a first target device in a memory, periodically identifying unnecessary ones of the unit attentions stored in the memory, and removing the unnecessary unit attentions from the memory. Embodiments of the software product may include the variations described in connection with the method embodiments.

Numerous additional embodiments are also possible.

The various embodiments of the invention may provide a number of advantages over the prior art. For example, because unnecessary unit attentions are removed from the queues for the respective initiator devices, fewer unit attentions will be provided by the system to the initiator devices in response to receiving commands from the initiator devices. This may save significant amounts of time and resources that would otherwise be expended in processing these unit attentions. Another advantage that may be provided by the various embodiments is that initiator devices may be less likely to erroneously conclude (from the number of consecutive unit attentions) that the target device is malfunctioning. Still other advantages may also be provided by the different embodiments of the invention.

BRIEF DESCRIPTION OF THE DRAWINGS

Other objects and advantages of the invention may become apparent upon reading the following detailed description and upon reference to the accompanying drawings.

Figure 1:
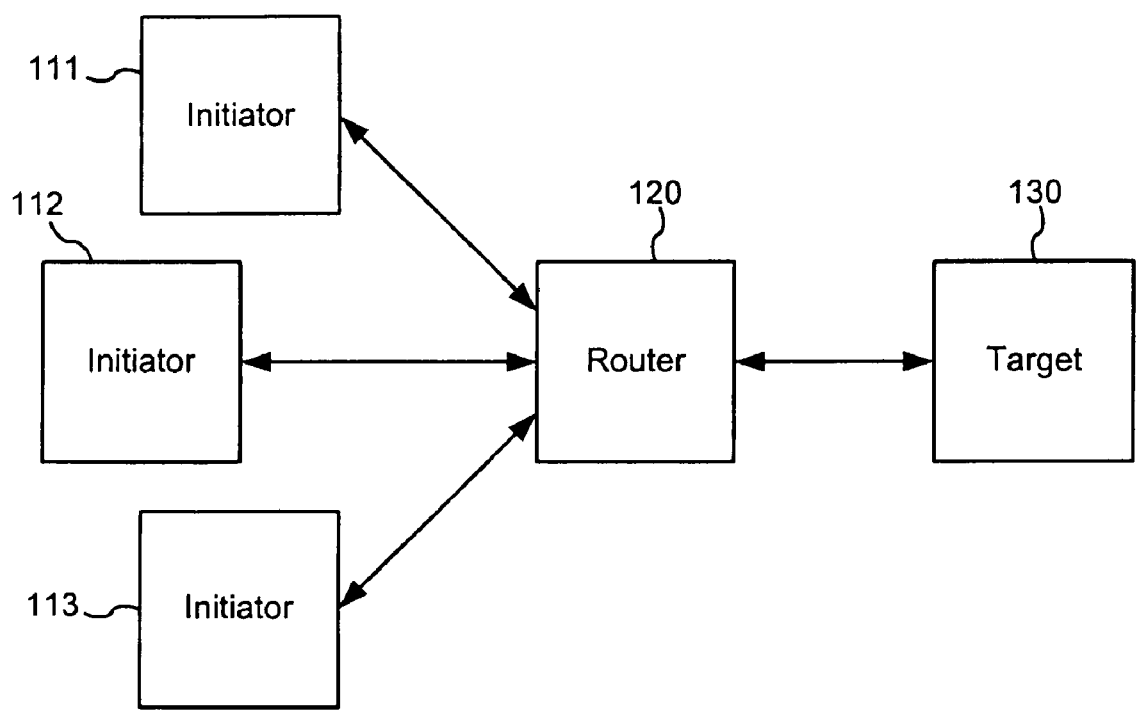
FIG. 1 is an exemplary system in which multiple initiator devices are coupled to a target device through a router in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for reducing the number of unit attentions provided to a set of initiator devices by eliminating unnecessary unit attentions from queues in which unit attentions for each of the initiator devices are stored.

In one embodiment, a system comprises a processor and a memory implemented in a router that is coupled between a target device and multiple initiator devices. As each unit attention is generated by the target device, it is forwarded to the initiator device that prompted the unit attention, and is also stored in a queue for each of the other initiator devices. Unit attentions are thereby accumulated for the initiator devices. Periodically, it is determined whether any of the unit attentions stored in the queues are unnecessary. One or more of the unit attentions that are determined to be unnecessary may be eliminated from the respective queues, thereby reducing the number of unit attentions that are provided to the respective initiator devices.

As noted above, one embodiment of the invention is implemented in a system in which multiple initiator devices are coupled to a target device through a router. An exemplary configuration is illustrated in FIG. 1. FIG. 1 shows multiple initiator devices 111–113. These initiator devices may be any type of initiator devices that are found in the art. For example, in one embodiment, each of initiator devices 111–113 may be a general-purpose, host computer. Each of initiator devices 111–113 is coupled to a router 120. Router 120 is in turn coupled to target device 130. Target device 130 may be any type of target device that is found in the art. For example, target device 130 may be a tape drive that is used by each of initiator devices 111–113 to back up the data thereon.

In one embodiment, router 120 is a Fibre Channel-to-SCSI router. Router 120 is coupled to each of initiator devices 111–113 by a Fibre Channel interconnect and is configured to communicate with each of these initiator devices using a Fibre Channel protocol. Router 120 is coupled to target device 130 by a SCSI interconnect and is configured to communicate with target device 130 using a SCSI protocol.

A SCSI target device is typically configured to be coupled directly to a single initiator device, rather than to multiple initiator devices. The target device typically cannot distinguish between initiator devices. In the system of FIG. 1, this is resolved by router 120. Router 120 is configured to direct the communications between initiator devices 111–113 and target device 130 so that each of these devices can operate as if it were only connected to a single device. The operation of router 120 is typically transparent to the initiator and target devices. In other words, each of initiator devices 111–113 communicates with router 120 as if router 120 was the intended target device (target device 130). Similarly, target device 130 communicates with router 120 as if router 120 were a single initiator device that generated all of the commands directed to target device 130.

It should be noted that, although the particular embodiments described in this disclosure focus on the use of Fibre Channel interconnects and protocols between a router and a set of initiator devices, and the use of a SCSI interconnect and protocol between the router and a target device, alternative embodiments may use other types of interconnects and/or protocols. The invention may be applicable to many different systems in which a target in one domain needs to communicate with multiple initiators in another domain. It should also be noted that SCSI itself comprises a family of protocols, including, but not limited to, iSCSI, parallel SCSI, serial SCSI, etc.

It should also be noted that, while "unit attentions" are a mechanism that is implemented in SCSI protocols, there may be similar notifications that are implemented in non-SCSI protocols and that can be handled in a manner similar to the manner in which SCSI unit attentions are handled. The use of the term "unit attention" in the present disclosure should therefore be construed to include such notifications in non-SCSI protocols. As noted above, the non-SCSI protocols themselves should also be considered to be within the scope of the present disclosure.

The handling of communications between initiator devices 111–113 and target device 130 is not simply a matter of ensuring that communications from target device 130 are directed to the appropriate one of initiator devices 111–113. The operation of router 120 is complicated somewhat by the fact that unit attentions generated by target device 130 in response to a command received from one of the initiator devices should be provided, not only to the particular initiator device that prompted the unit attention, but also to the other initiator devices. There is, however, no means to broadcast the unit attentions to each of the initiator devices. Instead, the unit attentions are stored in router 120 so that they can be provided to each of the initiator devices in response to commands that are later received from the respective initiator devices.

Figure 2:
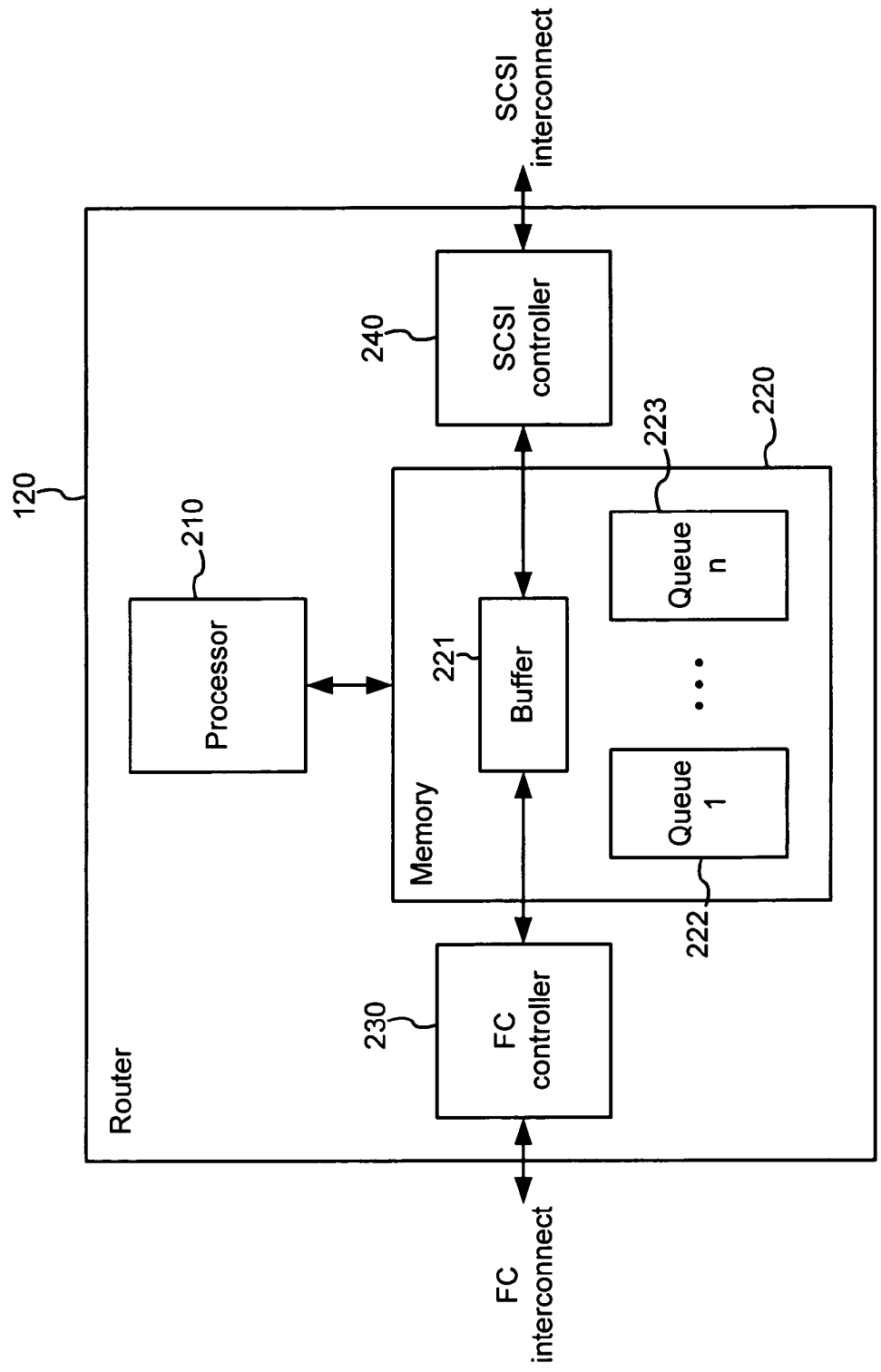
FIG. 2 is a functional block diagram illustrating the structure of a router in accordance with one embodiment.

Referring to FIG. 2, a more detailed view of router 120 is shown. In this figure, it can be seen that router 120 includes a processor 210, a memory 220, a Fibre Channel controller 230 and a SCSI controller 240. Fibre Channel controller 230 is coupled to the Fibre Channel interconnects that allow router 120 to communicate with the initiator devices. SCSI controller 240 is coupled to the SCSI interconnect that allows router 120 to communicate with the target device. Controllers 230 and 240 are coupled to processor 210. Processor 210 controls the transfer of data through router 120. Data received from a source device by one of the controllers is transferred to a buffer 221, processed, and then transferred to the other controller so that it can be communicated to the destination device. If the source device is one of the initiator devices, the data is received by Fibre Channel controller 230, transferred to buffer 221, processed, transferred to SCSI controller 240 and then transmitted to the target device. Conversely, if the source device is the target device, the data is received by SCSI controller 240, transferred to buffer 221, processed, transferred to Fibre Channel controller 240 and then transmitted to the appropriate one of the initiator devices.

Memory 220 also includes multiple queues 222–223. Queues 222–223 are provided for storage of unit attentions that are generated by the target device. Queues 222–223 may therefore be referred to as unit attention queues. Although only two queues are shown in FIG. 2, it should be noted that there may be additional queues. Each of queues 222–223 corresponds to one of the initiator devices. The queue corresponding to each initiator device stores the unit attentions that have been generated by the target device and which have not yet been communicated to the initiator device associated with the queue. Thus, referring to the system illustrated in FIG. 1, there are three initiator devices (111–113), so there would be three corresponding queues in memory 220 of router 120.

It should be noted that there may also be a queue or other data storage structure (not shown in FIG. 2) that stores identifiers for each of the initiator devices. This data structure may be referred to herein as an initiator stack. In one embodiment, the initiator stack is populated with the identifiers of the initiator devices by adding each new initiator device to the stack as the device sends a command through the router to the target device. The initiator stack may be used by processor 210 to keep track of the initiator devices that are coupled to router 120 and ensure that, when a unit attention is received from the target device, a copy of the unit attention is placed in the queues corresponding to each of the initiator devices. In other words, the router may, upon receiving a unit attention, forward the unit attention to the initiator that prompted it and then go through the initiator stack to identify the initiator devices for which the unit attention should be stored in a corresponding queue.

The queues may be implemented as stacks, FIFOs or various other data storage structures. In one embodiment, the queues are FIFOs allocated within memory 220, where the unit attentions are passed to the initiator devices on a first-in-first-out basis, but are randomly accessible for the purposes of identifying and removing unnecessary unit attentions.

The system described above operates in the following manner. It is assumed that, initially, no unit attentions are pending in the target device or the router. At some point, the target device experiences a condition that necessitates a unit attention. The unit attention is maintained in a queue in the target device until a command is received. One of the initiator devices then sends a command to the router. The router forwards the command to the target device. Because a unit attention is pending in the target device when the command is received, the target device responds to the command by providing the unit attention (instead of the reply that would normally be provided in response to the command). When the unit attention is sent by the target device, it is cleared from the target device's unit attention queue. The unit attention is received by the router, which forwards the unit attention to the initiator device that sent the command. For each of the other initiator devices, the router stores the unit attention in a corresponding unit attention queue.

The next time the router receives a command for the target device, the router checks the one of its unit attention queues corresponding to the initiator device from which the command is received. If there are no unit attentions in the queue, the command is passed through to the target device. The target device will respond to the command with the appropriate reply data, or the next unit attention pending in the target device's queue, if there is one. Thus, in accordance with the previous example, if the command received by the router is sent by the initiator device that sent the previous command, no unit attentions will be pending in the router, and the command will be forwarded to the target device. If, on the other hand, the command received by the router is sent by one of the other initiator devices, the unit attention that was previously forwarded to the first initiator device will still be pending in the queues corresponding to the other initiator devices, so the router will return the unit attention to the initiator device rather than forwarding the command to the target device. When the unit attention is forwarded to the initiator device, the unit attention is cleared from the queue corresponding to that initiator device. The unit attention remains pending in the queues of those initiator devices that have not yet received it.

The operation of the system may continue in this manner, with the target device generating additional unit attentions, and the router forwarding the unit attentions to appropriate ones of the initiator devices and storing the unit attentions in the queues corresponding to others of the initiator devices. Because one or more of the initiator devices may be inactive with respect to the target device for a period of time, the unit attention queues within the router may each accumulate a number of unit attentions that have not yet been forwarded to the respective initiator devices. As noted above, the unit attentions stored in a particular queue may include unit attentions that are redundant, or that are no longer meaningful. For example, if there are multiple media-change unit attentions, all but one would typically be redundant because, upon receiving a media-change unit attention, an initiator device would be aware that it should check the media volume currently accessible by the target device before attempting to write to this media volume. This is true whether the media volume has been changed once, twice, or many times. In another example, when an initiator device receives a power-cycle/reset unit attention, it is aware that all of the settings of the target device must be checked before the target device is accessed. It would therefore be unnecessary to provide a media-change unit attention to the initiator device because it would convey no additional information to the initiator device as compared to the power-cycle/reset unit attention. These types of unit attentions are referred to herein as "unnecessary" unit attentions.

As noted above, these unnecessary unit attentions are conventionally maintained in the queues and distributed to the initiator devices as commands are received from these devices. Because these unit attentions are not meaningful, the resources expended by the initiator devices and the router in processing them is wasted. Possibly even more problematic is the possibility that an initiator device may, after receiving a number of unit attentions in response to consecutive commands, make a determination that the target device is malfunctioning, or is otherwise unavailable. The initiator device may therefore simply stop attempting to access the target device, even though the target device is available and operating normally.

In order to address this problem in the present embodiment, the router is configured to periodically examine the queues associated with each of the initiator devices to determine whether any of the unit attentions stored therein are unnecessary. If an unnecessary unit attention is identified in a particular queue, that unit attention can be removed from the queue so that no resources are wasted in processing the unit attention.

Figure 3:
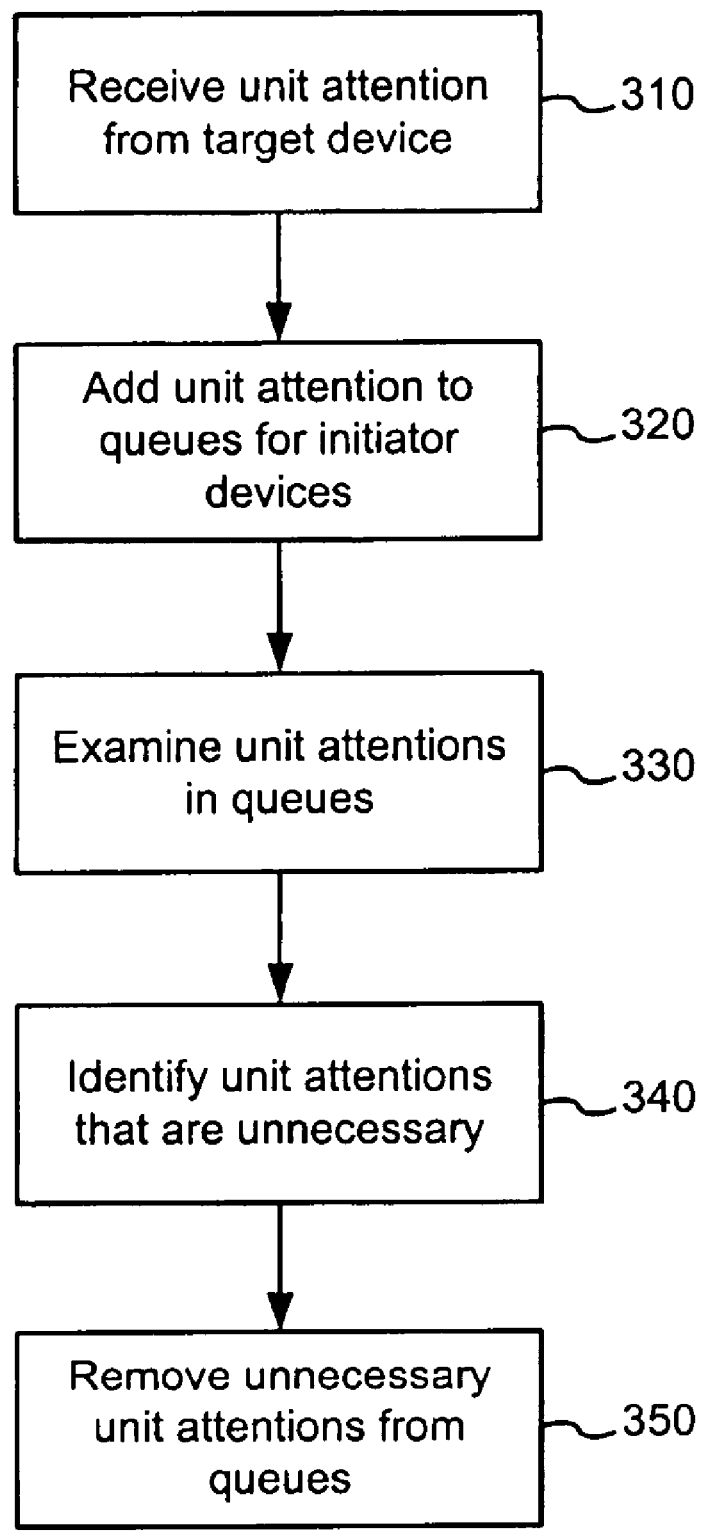
FIG. 3 is a flow diagram illustrating the examination of the queued unit attentions and the elimination of unnecessary unit attentions in accordance with one embodiment.

Referring to FIG. 3, a flow diagram illustrating the examination of the queued unit attentions and the elimination of unnecessary unit attentions in accordance with one embodiment is shown. In this embodiment, the examination of the queued unit attentions is triggered by the receipt in the router of a unit attention from the target device. As shown in the figure, the method includes receiving the new unit attention (block 310), forwarding the new unit attention to the initiator device that prompted the new unit attention (block 320), storing the new unit attention in each of the queues for the other initiator devices (block 330), examining the queues associated with each of the initiator devices (block 340), identifying unnecessary unit attentions within each of the queues (block 350) and removing the unnecessary unit attentions from the queues (block 360).

In the embodiment of FIG. 3, the newly received unit attention is stored in the queues of all but one of the initiator devices. In another embodiment, the unit attention may be stored in the queues of all of the initiator devices and then, after the unit attention is forwarded to the initiator device that prompted the unit attention, the unit attention may be cleared from the queue of this initiator device. In yet another embodiment, all of the queues (or those corresponding to the initiator devices that did not prompt the unit attention) may be examined and the unit attention may be stored in only those ones of the queues in which the new unit attention is not redundant.

Other variations in the method may also be possible. For example, the forwarding of the new unit attention to the initiator device that prompted it may occur prior to or following the adding of the new unit attention to the queues. Methods of alternative embodiments may also be triggered by events other than receipt of the new unit attention. For example, the examination of the queues and identification and removal of unnecessary unit attentions may be performed periodically according to a predetermined schedule. Other variations will also be apparent to persons of skill in the art.

The interaction between the various devices in the system may therefore operate in the following manner in one embodiment. It is assumed for the purposes of this example that two initiator devices, Host 1 and Host 2, have been communicating with the target device, a tape drive, and have corresponding unit attention queues in the router. Initially, the unit attention queues for the two initiator devices are empty. The tape in the tape drive is then unloaded and reloaded. The tape drive therefore generates a "medium may have changed" unit attention. This unit attention is stored in the tape drive until a command is received from one of the initiator devices (via the router). When Host 1 sends a "test unit ready" command to the tape drive, the tape drive receives the command from the router and responds by sending a "check condition" status to the router, along with a Sense Key (unit attention) and a Sense Code (indicating that the medium may have changed). The router forwards the "check condition" status, Sense Key and Sense Code (collectively, the unit attention) to Host 1, and stores the unit attention in the queue of Host 2.

The tape drive is then power cycled. When the tape drive comes back up, it has a "power on" unit attention pending. This unit attention will be returned to the router in response to the next command received by the tape drive. Next, Host 1 sends another "test unit ready" command to the tape drive. The tape drive receives the command from the router and responds by sending the "power on" unit attention to the router. The router forwards the new unit attention to Host 1. Before storing the "power on" unit attention in the queue for Host 2, however, the router examines the queue to determine whether the new unit attention or any of the unit attentions already stored in the queue are unnecessary. In this instance, the "power on" unit attention has a higher priority than the previously stored "medium may have changed" unit attention. The "power on" unit attention is therefore stored in the queue and the "medium may have changed" unit attention is cleared from the queue. (If the second unit attention had been another "medium may have changed" unit attention, it would have been redundant, and one of the two "medium may have changed" unit attentions would be retained in the queue, while the other would be cleared.)

The next command is sent by Host 2 to the router. Because there is a unit attention (the "power on" unit attention) pending in the queue corresponding to Host 2, this unit attention will be returned by the router to Host 2 in response to receiving the command. This unit attention is then cleared from the queue for Host 2. It should be noted that the command from Host 2 is not forwarded to the tape drive at all. The queues corresponding to the initiator devices are now empty, so the next command received by the router (most likely from Host 2, following Host 2's receipt of the unit attention) will be forwarded to the tape drive. By comparison, if the unnecessary unit attention had not been removed from the queue, Host 2 would have had to send one additional command to clear the queue before the next command would actually make it to the tape drive.

As mentioned above, the determination that a particular unit attention is unnecessary may be based upon various criteria. In one embodiment, a unit attention that is a duplicate of another unit attention in the queue may be considered unnecessary. The duplicate unit attention may be exactly identical to another unit attention, or it may simply be of the same type as the other unit attention. For example, in one embodiment, any change-media unit attention may be considered a duplicate of any other change-media unit attention. In another embodiment, the change-media unit attentions may be considered duplicates only if they include identical parameters (e.g., the same media volume).

In another embodiment, the unit attentions may have priorities associated with them, so that when a unit attention of a higher priority is received, all unit attentions in the queue that have lower priorities are considered unnecessary. For example, a power-cycle/reset unit attention may have a higher priority than all other unit attentions. In this instance, when a power-cycle/reset unit attention is received, all other unit attentions in the queue may be considered unnecessary and may therefore be removed from the queue. This rule may be applied to all unit attentions in the queue, or only to previously or subsequently received unit attentions. Still other rules for determining which of the unit attentions are unnecessary may be implemented in other embodiments.

In addition to the variations that are possible in the method embodiments described above, many variations are possible in the physical (e.g., system) embodiments as well. For example, while the embodiments described above are implemented in a Fibre Channel-to-SCSI router, other embodiments may be implemented in routers that use other protocols, in devices other than routers, or even in the target device itself. The various embodiments may be implemented in any device that is coupled between one or more target devices and multiple initiator devices. Such "devices" are intended to include circuit boards, integrated circuits for other components that may be integrated into the target device. For instance, a target device that appears to be configured to communicate with initiator devices via a Fibre Channel interconnects may actually be a SCSI target device that incorporates a circuit configured to perform the functions described herein. This particular example would be roughly equivalent to a target device that encompassed the functions of not only target device 130, but also router 120 (see FIG. 1).

It should also be noted that, some embodiments may be implemented in software. For instance, a router may be programmable to operate as determined by a software application that is executed by a data processor within the router. The software application may include instructions that are configured to cause the data processor (hence the router) to perform a method as described herein. In this instance, the software itself, comprising the instructions embodied in a tangible medium readable by the data processor, is an alternative embodiment of the invention. The tangible medium may be any suitable medium, such as a floppy disk, hard disk, CD-ROM, DVD-ROM, RAM, ROM, DASD array, magnetic tape, optical storage device or the like.

"Data processor", as used herein, is intended to include any type of data processing device or system capable of performing the functions described herein. "Media readable by a data processor," as used herein, refers to any medium that can store program instructions that can be executed by a data processor, and may include floppy disks, hard disk drives, CD-ROMs, DVD-ROMs, RAM, ROM, DASD arrays, magnetic tapes, floppy diskettes, optical storage devices and the like.

Those of skill in the art will understand that information and signals may be represented using any of a variety of different technologies and techniques. For example, data, instructions, commands, information, signals, bits, symbols, and the like that may be referenced throughout the above description may be represented by voltages, currents, electromagnetic waves, magnetic fields or particles, optical fields or particles, or any combination thereof. The information and signals may be communicated between components of the disclosed systems using any suitable transport media, including wires, metallic traces, vias, optical fibers, and the like.

Those of skill will further appreciate that the various illustrative functional blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative functional blocks, modules, and circuits described in connection with the embodiments disclosed herein may be implemented or performed with general purpose processors, digital signal processors (DSPs) or other logic devices, application specific integrated circuits (ASICs), field programmable gate arrays (FPGAs), discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of the methods or algorithms described in connection with the embodiments disclosed herein may be embodied directly in hardware, in software or firmware modules executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follows those terms Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
   a processor; and
   a memory coupled to the processor;
   wherein the processor is configured to
      store unit attentions received from a first target device in the memory,
      periodically identify unnecessary ones of the unit attentions stored in the memory, and
      eliminate one or more of the unnecessary ones of the unit attentions.

2. The system of claim 1, wherein the processor is configured to store the unit attentions in a plurality of stacks, wherein each stack is associated with a corresponding target device.

3. The system of claim 1, wherein the processor is configured to store the unit attentions in a plurality of stacks, wherein each stack is associated with a corresponding initiator device.

4. The system of claim 1, wherein each of the unit attentions is associated with a corresponding priority.

5. The system of claim 4, wherein the processor is configured to eliminate unnecessary ones of the unit attentions by identifying a first unit attention having a first priority, identifying a set of unit attentions having priorities lower than the first priority, and eliminating the identified set of unit attentions.

6. The system of claim 5, wherein the identified set of unit attentions comprises only unit attentions received prior to the first unit attention.

7. The system of claim 5, wherein the identified set of unit attentions comprises unit attentions received prior to and following the first unit attention.

8. The system of claim 1, wherein the system is configured to receive unit attentions only from the first target device.

9. The system of claim 1, wherein the system is configured to receive unit attentions one or more additional target devices.

10. A method comprising:
    storing unit attentions received from a first target device in a memory;
    periodically identifying unnecessary ones of the unit attentions stored in the memory; and
    removing one or more of the unnecessary ones of the unit attentions.

11. The method of claim 10, wherein storing the unit attentions comprises storing the unit attentions in a plurality of stacks, wherein each stack is associated with a corresponding target device.

12. The method of claim 10, wherein storing the unit attentions comprises storing the unit attentions in a plurality of stacks, wherein each stack is associated with a corresponding initiator device.

13. The method of claim 10, further comprising associating a priority with each of the unit attentions.

14. The method of claim 13, further comprising identifying a first unit attention having a first priority, identifying a set of unit attentions having priorities lower than the first priority, and removing the identified set of unit attentions from the memory.

15. The method of claim 14, wherein the identified set of unit attentions comprises only unit attentions received prior to the first unit attention.

16. The method of claim 14, wherein the identified set of unit attentions comprises unit attentions received prior to and following the first unit attention.

17. A software product comprising a medium readable by a data processor,
    wherein the medium has instructions embodied therein, the instructions being configured to cause the data processor to perform the method comprising:
       storing unit attentions received from a first target device in a memory;
       periodically identifying unnecessary ones of the unit attentions stored in the memory; and
       removing one or more of the unnecessary ones of the unit attentions.

18. The software product of claim 17, wherein storing the unit attentions comprises storing the unit attentions in a plurality of stacks, wherein each stack is associated with a corresponding target device.

19. The software product of claim 17, wherein storing the unit attentions comprises storing the unit attentions in a plurality of stacks, wherein each stack is associated with a corresponding initiator device.

20. The software product of claim 17, wherein the method further comprises associating a priority with each of the unit attentions.

21. The software product of claim 20, wherein the method further comprises identifying a first unit attention having a first priority, identifying a set of unit attentions having priorities lower than the first priority, and removing the identified set of unit attentions from the memory.

22. The software product of claim 21, wherein the identified set of unit attentions comprises only unit attentions received prior to the first unit attention.

23. The software product of claim 21, wherein the identified set of unit attentions comprises unit attentions received prior to and following the first unit attention.

* * * * *